United States Patent
Haefele et al.

(10) Patent No.: US 11,115,232 B2
(45) Date of Patent: Sep. 7, 2021

(54) METHOD AND DEVICE FOR OPERATING A CONTROL UNIT

(71) Applicant: Robert Bosch GmbH, Stuttgart (DE)

(72) Inventors: Peter Haefele, Schemmerhofen (DE); Uwe Hartmann, Gerlingen (DE); Dirk Ziegenbein, Freiberg Am Neckar (DE); Simon Kramer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 584 days.

(21) Appl. No.: 16/076,256

(22) PCT Filed: Feb. 2, 2017

(86) PCT No.: PCT/EP2017/052194
§ 371 (c)(1),
(2) Date: Aug. 7, 2018

(87) PCT Pub. No.: WO2017/140504
PCT Pub. Date: Aug. 24, 2017

(65) Prior Publication Data
US 2021/0194720 A1 Jun. 24, 2021

(30) Foreign Application Priority Data
Feb. 16, 2016 (DE) .......................... 102016202305.5

(51) Int. Cl.
*H04L 12/40* (2006.01)
*B60W 50/00* (2006.01)
(Continued)

(52) U.S. Cl.
CPC ............. *H04L 12/40* (2013.01); *B60W 50/00* (2013.01); *G06F 9/3877* (2013.01);
(Continued)

(58) Field of Classification Search
CPC ...... G06F 9/3877; G06F 9/4887; G06F 9/544; H04L 12/40; H04L 2012/40273; B60W 50/00; B60W 2050/0043
See application file for complete search history.

(56) References Cited

U.S. PATENT DOCUMENTS 6,195,699 B1 * 2/2001 Dennis ................. G06F 9/4887
370/238
8,453,003 B2 5/2013 Kanoh
(Continued)

FOREIGN PATENT DOCUMENTS

CN 104008005 A 8/2014
CN 104331327 A 2/2015
(Continued)

OTHER PUBLICATIONS

Ghosal, et al.: "Event-Driven Programming with Logical Execution Times", Proc. International Workshop on Hybrid Systems: Computation and Control (HSCC) 2993 (2004), pp. 357-371.
(Continued)

*Primary Examiner* — Henry Tsai
*Assistant Examiner* — John B Roche
(74) *Attorney, Agent, or Firm* — Norton Rose Fulbright US LLP; Elizabeth Tretter

(57) ABSTRACT

A method for operating a control unit, in particular for a motor vehicle, the control unit including at least one execution unit for executing task programs, a first task program and a second task program being executed at least intermittently, the first task program providing data for the second task program at the end of a first predefined time interval, wherein a transfer of the data from the first task program to the second task program only takes place after a particular last execution of the first task program within a predefined second time interval for the execution of the second task
(Continued)

program, the second time interval being longer than the first time interval.

7 Claims, 6 Drawing Sheets

(51) Int. Cl.
 *G06F 9/48* (2006.01)
 *G06F 9/54* (2006.01)
 *G06F 9/38* (2018.01)

(52) U.S. Cl.
 CPC ............ *G06F 9/4887* (2013.01); *G06F 9/544* (2013.01); *B60W 2050/0043* (2013.01); *H04L 2012/40273* (2013.01)

(56) References Cited

U.S. PATENT DOCUMENTS

2002/0165645 A1* 11/2002 Kageyama ............. G01C 21/26
 701/1
2012/0265367 A1* 10/2012 Yucelen ............... G05B 13/042
 701/1
2016/0147568 A1* 5/2016 Poledna .................... G06F 1/14
 718/102

FOREIGN PATENT DOCUMENTS

| | | |
|---|---|---|
| CN | 104462987 A | 3/2015 |
| DE | 10229520 A1 | 1/2004 |
| EP | 1870806 A1 | 12/2007 |
| EP | 2687931 A1 | 1/2014 |
| WO | 2013011713 A1 | 1/2013 |
| WO | 2014205467 A1 | 12/2014 |

OTHER PUBLICATIONS

International Search Report for PCT/EP2017/052194, dated Jun. 12, 2017.

T.A. Henzinger, B. Horowitz, and CM. Kirsch, "Embedded Control Systems Development With Giotto", In Proc. ACM Sigplanworkshop on Languages, Compilers, and Tools for Embedded Systems (LCTES), ACM,2001.

* cited by examiner

METHOD AND DEVICE FOR OPERATING A CONTROL UNIT

FIELD OF THE INVENTION

The present invention relates to a method and a device for operating a control unit.

BACKGROUND INFORMATION

One patent publication from this field is DE 102 29 520 A1.

In the case of control processes in vehicles, operating systems are used as the basis for executing control processes. In operating systems, in particular real-time operating systems, as are used, for example, in embedded systems in the automotive industry, the functions are often allocated onto multiple task programs having different sampling times, so that time-critical parts may be calculated more often than less time-critical algorithms or programs or program parts. A task program is a software unit, which is also referred to as a task hereafter. The operating system ensures the data consistency in the normal case. Thus, copies are created at suitable points in time of variables which are accessed in multiple tasks, so that, for example, the value does not change in slow tasks between two accesses, because the variable is written in a faster task.

In control applications, for example, in the vehicle dynamics control system ESP or also in the scope of an engine and transmission controller, deterministic behavior is to be ensured. This means that with identical starting conditions, the computed results (for example, cyclic output of actuator operations) are only dependent on the input variables (for example, the cyclically sampled sensor values), independently of the distribution of the software units onto the available processor cores and of the utilization of the system. In addition, it is ensured by the deterministic communication that the throughput time (latency) of a signal effect chain, which involves multiple software units, only moves within a small predefined frame, i.e., the jitters in the throughput times are thus small. Of course, it has to be ensured that all tasks may be carried out within the provided times, i.e., that the processor cores are not overloaded.

The deterministic behavior may improve the control quality in control systems, may simplify calibration and testing in the development process, may substantially facilitate the migration to other processing units, for example, having multiple processor cores, with optimized distribution of the software units onto the processor cores, and may assist achieving goals of functional security on processing units having one or multiple processor cores. Moreover, it is ensured that, for example, within the scope of a model-based development methodology, the system always behaves functionally identically on different execution platforms, for example, simulation environment, development computer, series control unit.

Therefore, a method is desirable for communication between tasks which requires substantially fewer processor resources, for example, memory, runtime, or computing time than known approaches, and reduces peaks in the utilization of the communication channels.

SUMMARY OF THE INVENTION

The present invention relates to a method and a device as described herein. Data are thus logically transferred at certain times between the software units controlled by the operating system, the physical transfer taking place chronologically distributed between the individual communication partners. Substantially fewer processor resources are thus required and peaks in the utilization of the communication channels are reduced.

The advantage in relation to a deterministic communication method of the type mentioned at the outset is the omission of a buffer memory and the avoidance of more than one receiving memory for the data to be transferred, whereby substantial memory space may be saved in the case of a large amount of data exchanged between the tasks and thus costs are reduced.

A further advantage is that the transmission or reception of the data does not take place after every execution of the transmitter or receiver, respectively, but rather the data are communicated in a targeted manner only at certain points in time as a function of the ratios of the activation periods between two tasks. This results in a reduction of busload and computing time demand.

One additional task per communication relationship may advantageously be omitted, to save processor resources. Moreover, under certain conditions, further resources may be saved by multiple usage of the same input memories.

Advantageously, the first task program runs on a first execution unit and the second task program runs on a second execution unit in the control unit. Tasks running in parallel on different processor cores may thus exchange data with one another.

The length of the second time interval is advantageously an integer multiple of the length of the first time interval. The interval boundaries between the tasks which are started simultaneously are thus synchronous.

Data are advantageously transferred from a memory area associated with the first task program directly into a memory area associated with the second task program. The data are thus transmitted by only one copying procedure directly from the transmitter to the receiver, without the data having to be initially copied into a buffer memory. In spite of the avoidance of peaks in the communication load and the saving of memory space and computing time, a deterministic overall system behavior is thus furthermore ensured.

In addition, a third task program is advantageously executed to transfer data from a memory area associated with the first task program into a buffer memory and from the buffer memory into a memory area associated with the second task program.

Communication is thus possible between tasks which are not started simultaneously or which do not have integer multiple lengths in relation to one another.

The first task program and the second task program advantageously have different cycle times, a cycle time of the first task program being less than the cycle time of the second task program, and data being transferred from a memory area associated with the first task program into a memory area associated with the second task program within that cycle of the first task program which is chronologically in the range of a cycle end of the second task program. The results of the last execution of the more rapidly repeating first task program are thus used for communication with the more slowly repeating second task program. The most up-to-date results are thus provided for communication.

In a first operating state within a time interval associated with the particular task program, another task program preferably does not access the memory area which is associated with the particular task program, in a second operating state, the particular task program not accessing this memory area within this time interval. The output variables are thus not copied before updated values are provided or the output variables are not changed during the copying procedure.

A first memory area for input data is preferably associated with a task program, a second memory area for output data being associated with the task program, a piece of status information being provided, which indicates that within one execution of the task program, the input data are no longer accessed before the end of the present time interval and no further modifications on the output data will be carried out. The piece of additional information controls the data access. The copying procedure itself is thus "wait-free."

Further advantages and advantageous embodiments result from the description herein.

The present invention will be explained in greater detail hereafter on the basis of the figures shown in the drawings.

In the figures, elements corresponding to one another are identified by the same reference numerals.

DETAILED DESCRIPTION

Figure 1:
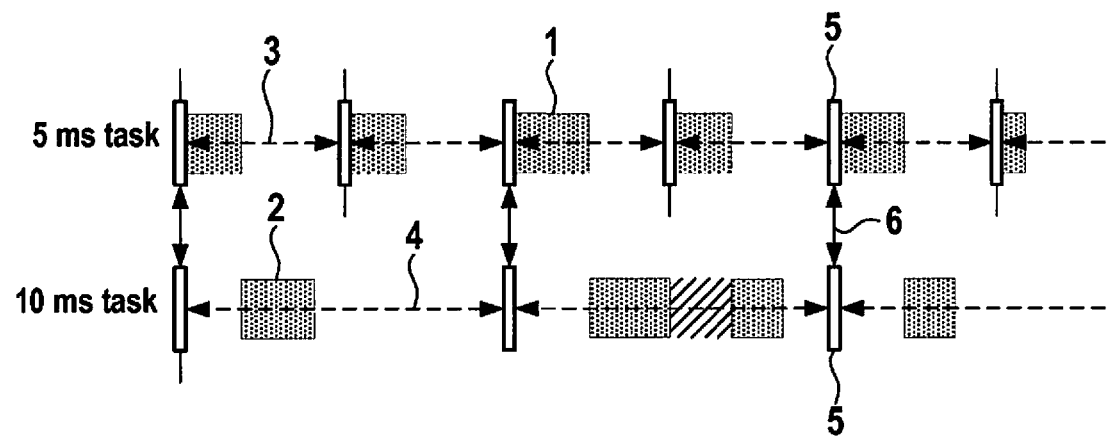
FIG. 1 schematically shows a sequence of tasks.

FIG. 1 shows an exemplary system including two software units. The software units are task programs which run as a 5 ms task and a 10 ms task. In FIG. 1, an example of a 5 ms task is shown as rectangle 1. In FIG. 1, an example of a 10 ms task is shown as rectangle 2. The task programs do not require the full 5 ms or 10 ms, respectively, as shown in FIG. 1. The length of rectangles 1, 2 and their position on or along time axis t represents, by way of example, start, end, and the duration of the individual computations. This means that the task programs are activated every 5 ms and 10 ms. The activation does not necessarily take place at the beginning of one of the tasks. The tasks are carried out within a predefined interval of the length 5 ms, shown by double arrow 3, and 10 ms, shown by double arrow 4. Every 10 ms, data are logically exchanged between the tasks at shared interval boundaries 5. The data exchange is schematically shown as double arrow 6. The data exchange takes place bidirectionally or in only one of the two directions.

The peak in the communication demand is at interval boundaries 5 if communication 6 is implemented as shown.

An operating system of the type mentioned at the outset ensures the corresponding sequences.

The corresponding method presumes a fixed, integer ratio of the activation rates of the individual tasks and is usable without expansions only for processing units including one processor core (single core processor).

The example of FIG. 1 shows such an implementation of the tasks on the same processor core using priority-controlled execution.

Another communication between tasks uses a buffer memory, into which the transmitter writes its output data at the task end, and from which the receiver reads its input data at the task beginning. To guarantee data coherency, the access to the buffer memory has to be protected; this means, for example, that while the transmitter writes data into the buffer memory, the receiver cannot copy input data and has to wait.

For the communication between a first and a second task, it may be provided that the first task activates an additional notification task in the context of the second task for coordination of the communication. The first task or the second task is informed about the upcoming communication by the notification task.

The concept of logical execution time (LET) is used hereafter, by which the chronological behavior of software units, and in particular the communication behavior between the units, may be described independently of the allocation onto connected processing units and the performance of the executing processing units. This concept was introduced in the book "T. A. Henzinger, B. Horowitz, and C M. Kirsch. Embedded control systems development with Giotto. In Proc. ACM SIGPLANWorkshop on Languages, Compilers, and Tools for Embedded Systems (LCTES). ACM, 2001" and will be used accordingly hereafter.

A predefined time interval is available for the execution of each of the software units. The input variables are available to the software unit at the beginning of the time interval, and the output variables computed by the software unit are available to the other software units precisely at the end of the interval. The execution of the software unit may take place at arbitrary times within the time interval.

The communication between the software units takes place logically in each case at the beginning and at the end of the time intervals, either by communication at precisely these points in time (for example, by the preparation of copies of the output data in the working area of the receiver), or by creating multiple memories for the data, between which a switch is made at run time, i.e., while the transmitter writes into one of the memories, the receiver may read consistent data from a preceding transmission cycle from another memory.

The communication between various executable software units, i.e., the task programs or tasks, is coordinated in a real-time regulating system by the method described hereafter.

It is ensured that the communication between the tasks only takes place at certain points in time, with the goal of ensuring a deterministic and reproducible behavior of the overall system, independently of the utilization of the executing processing unit.

Figure 2:
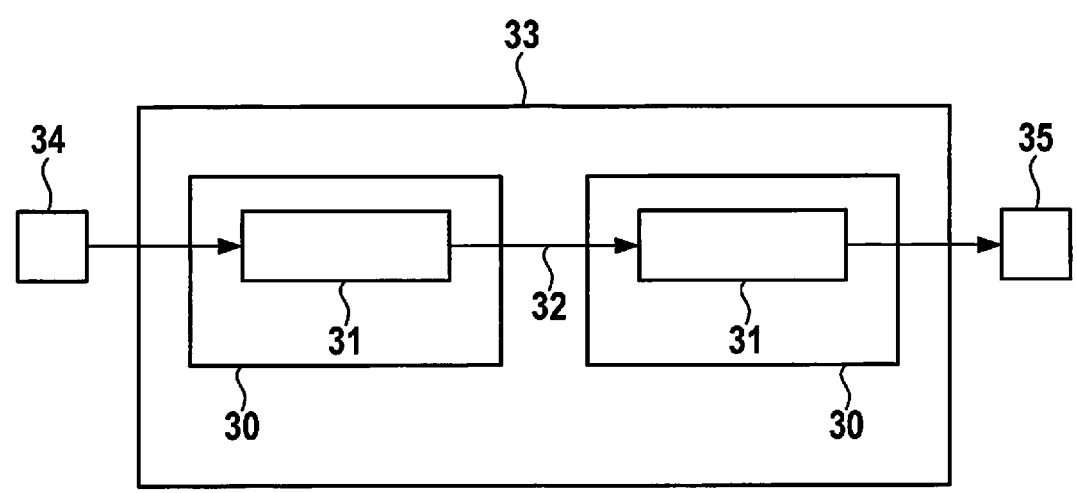
FIG. 2 schematically shows a controller.

FIG. 2 schematically shows an electronic control unit 33 including two execution units 30. These are, for example, processor cores or processing units, on each of which a software unit 31 is cyclically executed, data being transferred from one to the other software unit. This data transfer is shown as an arrow having reference numeral 32 in FIG. 2. One input variable 34 or multiple input variables 34 or input data, for example, physical values, are measured and processed in control unit 33. One output variable 35 or multiple output variables 35 or output data of control unit 33 are output, for example, as control variables, to the physical environment. For this purpose, corresponding nonvolatile memories or data interfaces are provided in control unit 33.

It will be described hereafter on the basis of multiple input variables 34 and multiple output variables 35 how communication 32 may be carried out between various software units 31 in a resource-preserving manner in such a way that output variables 35 are deterministically dependent only on input variables 34, independently of the distribution of software units 31 onto execution units 30 and independently of the utilization of execution units 30. This also applies in the same way to one input variable 34 or one output variable 35.

Figure 3:
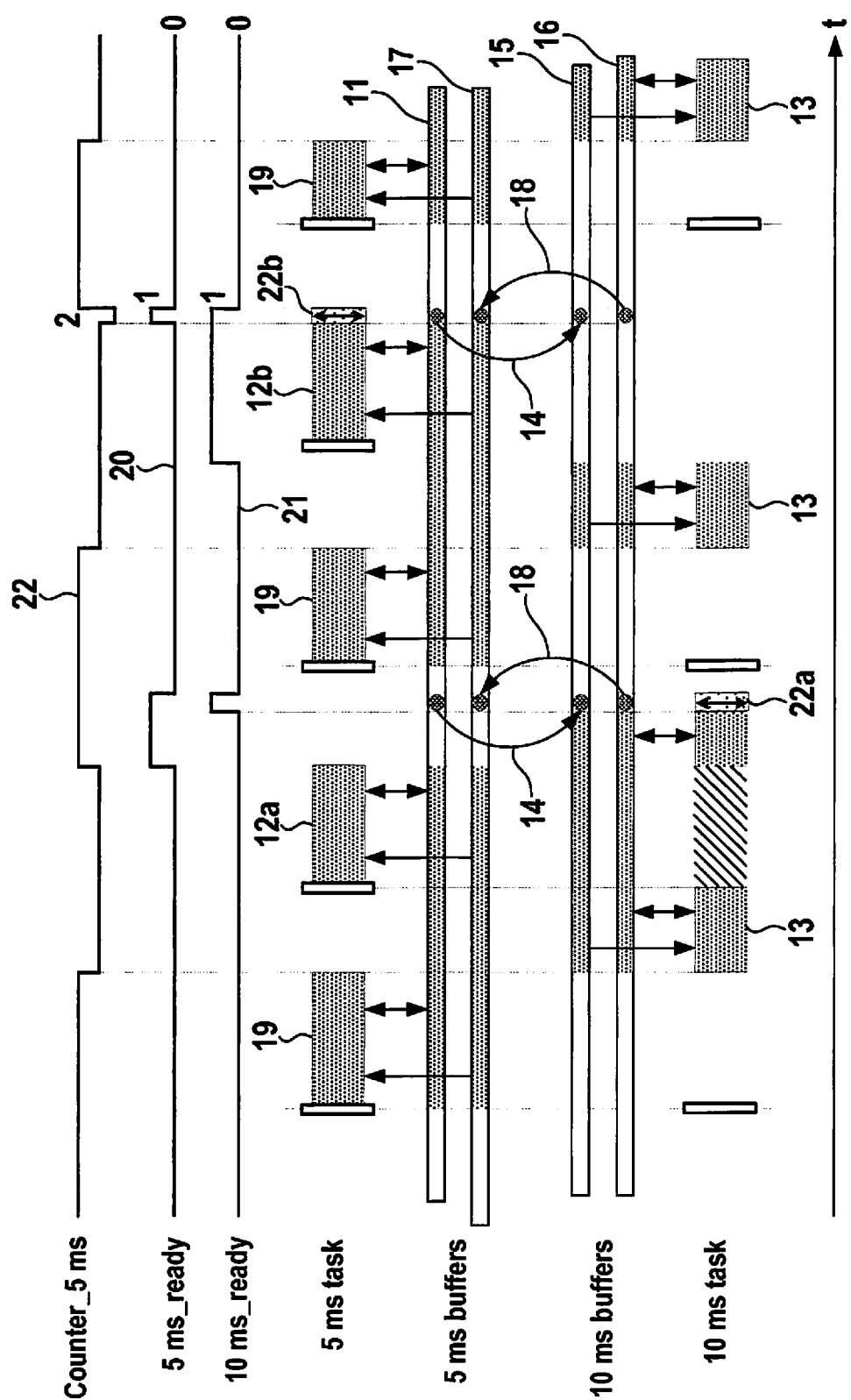
FIG. 3 schematically shows copying and transfer routines.

FIG. 3 shows a communication between a 5 ms and a 10 ms task. A program sequence ensures that the transfer of the data from the transmitter to the receiver takes place precisely once per slower time interval. It is ensured by a counter mechanism that a data transfer is only carried out after the particular last execution of the faster task within the time interval of the slower task. Counters counter_5 ms, 5 ms_ready, and 10 ms_ready of the counter mechanism are shown in FIG. 3 and are identified with 22, 20, and 21.

The deterministic behavior within the meaning of "logical execution time" is thus ensured.

In the example in FIG. 3, the 5 ms task has the higher activation rate in comparison to the 10 ms task. Therefore, a data transfer is carried out only in the case of every second execution 12*a/b*, but not in the case of executions 19. A counter 22 is decremented for this purpose at the end of the faster task in each case.

When the count of counter 22 reaches zero, the data transfer is permitted and the counter is reset to a value which corresponds to the ratio of slower sampling time to faster sampling time. In the example of FIG. 3, counter 22 is set to the value two. 5 ms_ready information 20 and 10 ms_ready information 21 represent operating states. For example, the state one means that the particular task is ready for data exchange. For example, the state Ø means that the particular task is not ready for data exchange.

The tasks may be executed on the same or on different processor cores.

One condition for the implementation of the present invention is that both tasks have access to the memory area relevant for the communication of the particular other task. Memory areas are identified in FIG. 3 as the buffer of the particular task.

The output variables computed by the 5 ms task, which are to be transferred into memory area 15 of 10 ms task 13, are located in a memory area 11 of 5 ms task 12*a/b* and 19.

Transfer 14 of the data from the transmitter to the receiver is to take place when every second 5 ms task 12*a/b* has completed the computation of the data to be output and the 10 ms task has simultaneously ended the processing of data 15 received in the preceding cycle. This is at the latest the case when both tasks may be completed.

This also applies to the communication in the other direction, from the 10 ms task to the 5 ms task. Output data 16 computed by 10 ms task 13 may be copied 18 at the same point in time into memory area 17 of 5 ms task 12*a/b* and 19.

To achieve the desired behavior, 5 ms task 12*a/b* sets a messaging bit 20 in a memory area addressable by both tasks as soon as the computations have been completed within the shared 10 ms interval and access to the received data is no longer required, i.e., at the latest at the end of every second 5 ms task 12*a/b*.

Similarly thereto, 10 ms task 13 sets a messaging bit 21 as soon the computations have been completed within one execution and access to the received data is no longer required, i.e., at the latest at the end of every 10 ms task.

The transfer of the data between the tasks takes place either at the end of a 5 ms task 12*a/b* or at the end of 10 ms task 13, depending on which event occurs later. In case 12*a*, data transfer 22*a* is carried out in both directions by the 10 ms task, because 5 ms task 12*a* has already been ended previously. In case 12*b*, data transfer 22*b* is carried out by 5 ms task 12*b*, because it is ended later than 10 ms task 13.

The detection of the task responsible for the data transfer takes place on the basis of status bits 20 and 21. Each of the two tasks sets the corresponding status bit when it is ready for the data exchange and thereafter queries the status of the particular other status bit. When both bits are set, the communication is carried out by calling up one of communication functions 22*a* or 22*b* and the status bits are reset. For example, a set status bit defines a range at the end of the particular task.

In general, a cycle of a first task lies with respect to time in the range of a cycle end of a cycle of a second task when a cycle of the first task ends within the cycle of the second task in a range in which the second task is ready for data exchange. The cycle time of the first task is preferably shorter than the cycle time of the second task. A cycle of the first task then lies with respect to time, for example, in the range of the cycle end of a cycle of the second task when the first task begins the second task after the beginning of this cycle, and ends in the range in which the second task is ready for data exchange in this cycle.

Status bits 20 and 21 are protected from simultaneous access by the two tasks. However, the actual copying procedure or communication procedure is lock-free and wait-free.

In the ideal case, functions 22*a* and 22*b* responsible for the data transmission are identical and are called at the end of the one or the other task. These functions are preferably generated in a tool-assisted manner depending on the communication relationships.

The following program examples schematically show how the desired behavior may be achieved on the basis of the example of a communication between a 5 ms and a 10 ms task:

At the end of the task having shorter sampling time 12*a/b* and 19, program code similar to the following is incorporated:

```
END_5ms:
counter _5ms = counter_5ms − 1
if (counter_ 5ms == 0
{
  protection_ on
  5ms_ready = true
  if (10ms_ready == true) copy = true
  protection_ off
  counter_5ms = 2 ! Ratio of the sampling times
}
if (copy == true)
{
  call copydata ! Generated function for copying the data in
  5ms_ready = false ! both directions
  10ms_ready = false
  copy = false
}
``` it is initially checked on the basis of a counter (counter_5 ms) whether data are to be exchanged in this time step. This relates only to the tasks having a shorter sampling time, otherwise the counter may be omitted.

In the example of FIG. 3, 10 ms task 13 does not require a counter, because data are to be exchanged with faster 5 ms task 12*a/b* in every time step.

If it has been established with the aid of the counter that data are to be exchanged, it is checked which of the tasks is responsible for the data exchange. Before the corresponding status bits may be queried and manipulated, it has to be ensured that both tasks involved in the communication may not access the status bits simultaneously. For this purpose, in most cases additional protection mechanisms (protection on/production off) have to be integrated into the program code to ensure consistent values for the states "5 ms_ready" and "10 ms_ready". It is ensured by known mechanisms of the operating system that only one of the two affected software units at a time may enter the area protected by a "protection." Depending on the distribution of the tasks onto the execution units, the protection mechanism has a local effect on only one execution unit, i.e., on the local processor core (core-local), for example, by temporarily preventing task changes, or beyond processor core boundaries, for example, by way of the use of spin locks.

After the control bit "5 ms_ready" has been set to signal that the 5 ms task is ready to transmit and receive data, the status of the other task is checked on the basis of the control bit "10 ms_ready". If this is also set, the 10 ms task is ready to exchange data and the communication may take place immediately, otherwise the communication is carried out later at the end of the 10 ms task.

For example, data are transferred from a 5 ms cycle of a first software unit 31. The 5 ms cycle from which the data are transferred is chronologically, for example, in the range of a cycle end of a 10 ms cycle of a second software unit 31. The range of the cycle end of second software unit 31 is the range in which second software unit 31 is ready to exchange data. The range begins, for example, as soon as the computations have been completed within an execution of second software unit 31 and access to the received data is no longer required. The range ends, for example, at the end of the particular cycle of second software unit 31.

To keep the time short, during which the access protection (protection) is active, the execution of the copying action is controlled by a logical variable "copy," so that the actual copying action may take place outside the protected range.

At the end of the task having the longer sampling time (13), program code similar to the following is incorporated:

```
END_10ms:
    protection_on
    10ms_ready = true
    if (5ms_ready == true) copy = true
    protection_off
if (copy == true)
{
    call copydata ! Generated function for copying the data in
    5ms_ready = false ! both directions
    10ms_ready = false
    copy = false
}
```

The program code is very similar to the code at the end of the 5 ms task, with the difference that the counter is omitted here, because the check is to take place at the end of each execution of the slower task.

Figure 4:
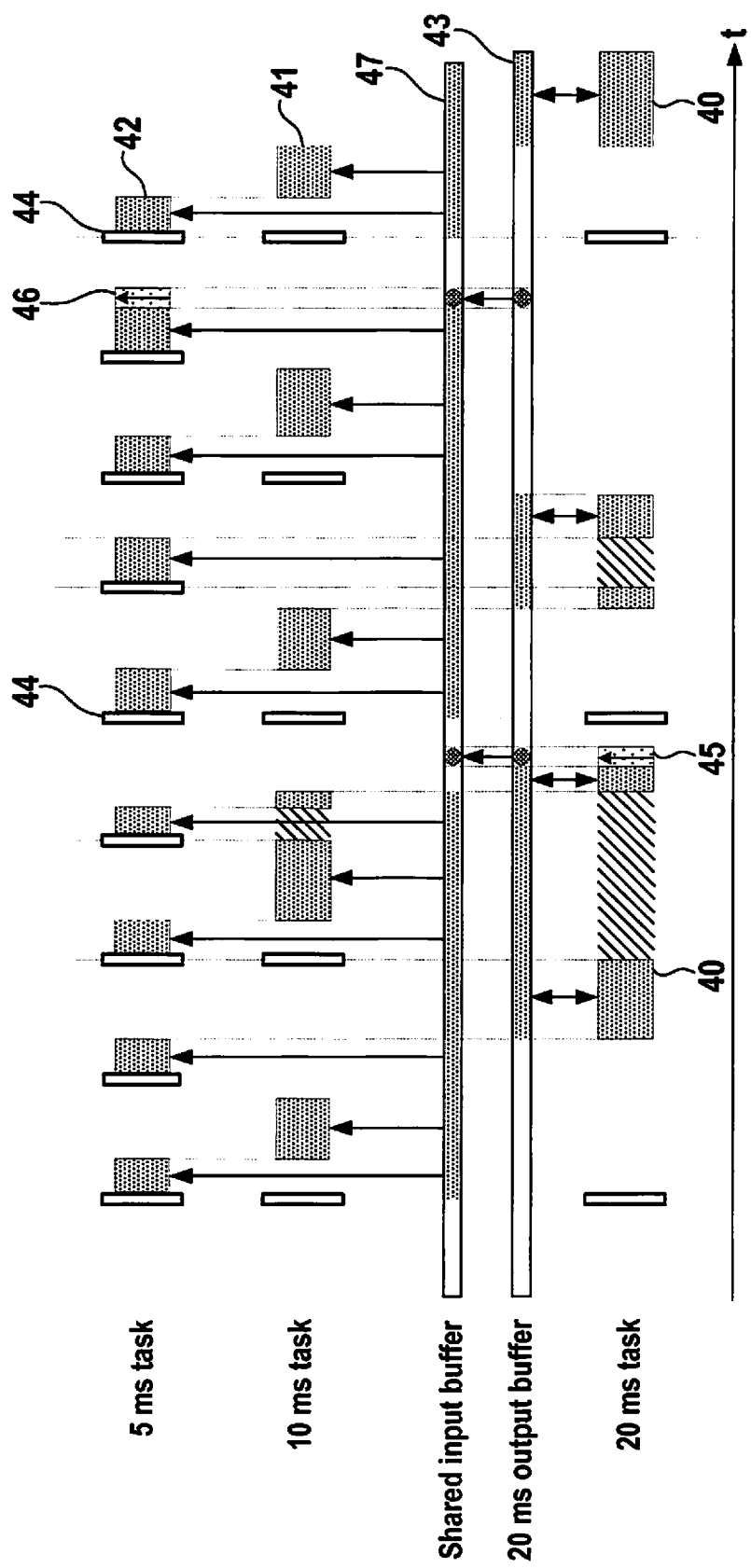
FIG. 4 schematically shows a method for control including a status bit.

FIG. 4 shows an optional optimization of the method for reducing the memory and computing time demand, which may be applied in a system having more than 2 communicating tasks. The optimization is based on the concept that in principle all data-receiving tasks, if they have a shorter (or equal) period duration or cycle time as the data-transmitting task, may use the same received data.

FIG. 4 shows an example including a data-transmitting 20 ms task 40 and two data-receiving tasks 41 and 42 each having shorter period duration 5 ms and 10 ms, respectively. 20 ms task 40 writes its output data into its memory area 43. Faster tasks 41 and 42 require input data from the 20 ms task, at least some of the input data being required by both tasks, to be able to save resources by this optimization.

At end 44 of the shared intervals of all participating tasks 40, 41, and 42, it is established by a method, similar to that described above, which of the tasks will be ended last. This task calls up communication function 45 and 46, as described above, which copies the input data required by receiver tasks 41 and 42 from memory area 43 into memory area 47. In the example, communication function 45 is called up at the end of the first shared interval by 20 ms task 40, because this task will be ended later than tasks 41 and 42. At the end of the second shared interval, 5 ms task 42 is ended last and calls up communication function 46.

Memory area 47 now contains all output data of 20 ms task 40, which are required as input data by one of the two receiver tasks 41 and 42 or by both. Both receiver tasks read their input data from the same memory area 47.

In this way, the input data required by both receiver tasks only have to be copied once and stored in memory area 47, whereby both memory space and also computing time may be saved.

In contrast, the logic for determining the task which executes the copying action becomes somewhat more complex, because now more than two possible tasks come into consideration for this purpose. In consideration of the distribution of the receiver tasks onto the processing units, an optimal combination may be ascertained between runtime and memory demand.

In FIG. 4, the communication is only shown in one direction. However, communication functions 45 and 46 may also carry out the communication in the other direction, from the output memory areas of faster tasks 41 and 42 to the input memory area of 20 ms task 40.

Figure 5:
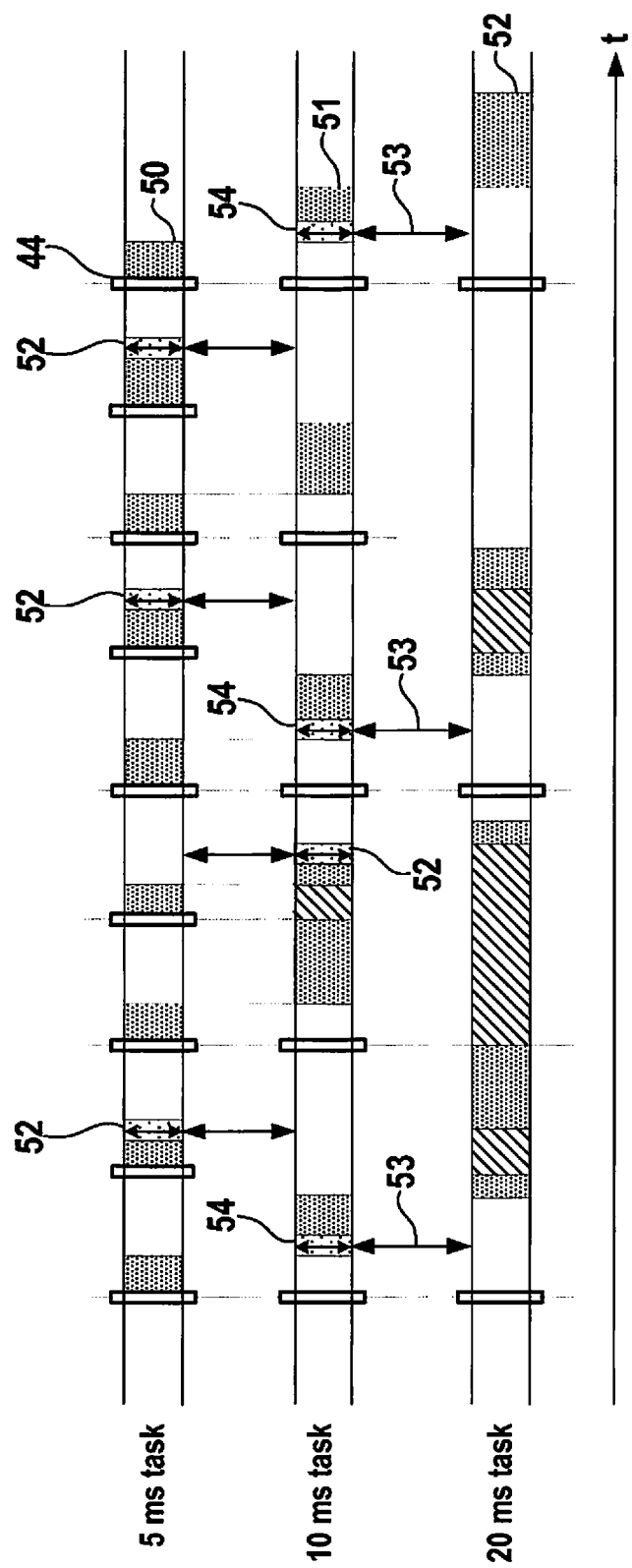
FIG. 5 schematically shows a method for control including more than two communicating tasks.

FIG. 5 shows an optional optimization of the method, which may be applied in a system having more than two communicating tasks.

The optimization enables copying operations to be shifted from the end of one interval to the beginning of the next interval in consideration of the software distribution, the scheduling, and/or the copied data.

Load peaks in the case of the superposition of various interval lengths are thus intentionally avoided and the load on the underlying bus system is further equalized with respect to time.

In FIG. 5, a 5 ms task 50 communicates with a 10 ms task 51 in each case at the end of the interval, as described above.

Communication function 52 is called up as described in each case at the end of the task last ended in the shared interval.

Communication 53 between 10 ms task 51 and 20 ms task 52 is shifted for the mentioned reasons to the beginning of the new interval. At the beginning of every second 10 ms task 51, communication function 54 is called up, which copies the values computed in the preceding interval between the tasks in both directions into the corresponding memory areas (not shown here) in each case.

This functions without further measures if it is ensured that the communication partner, i.e., in this case 20 ms task 52, is only executed after the communication is completed. This is automatically the case if, in the case of priority-based scheduling, both tasks are activated on the same execution unit, and the communication is executed by the higher-priority task, i.e., in this case by the faster 10 ms task.

Figure 6:
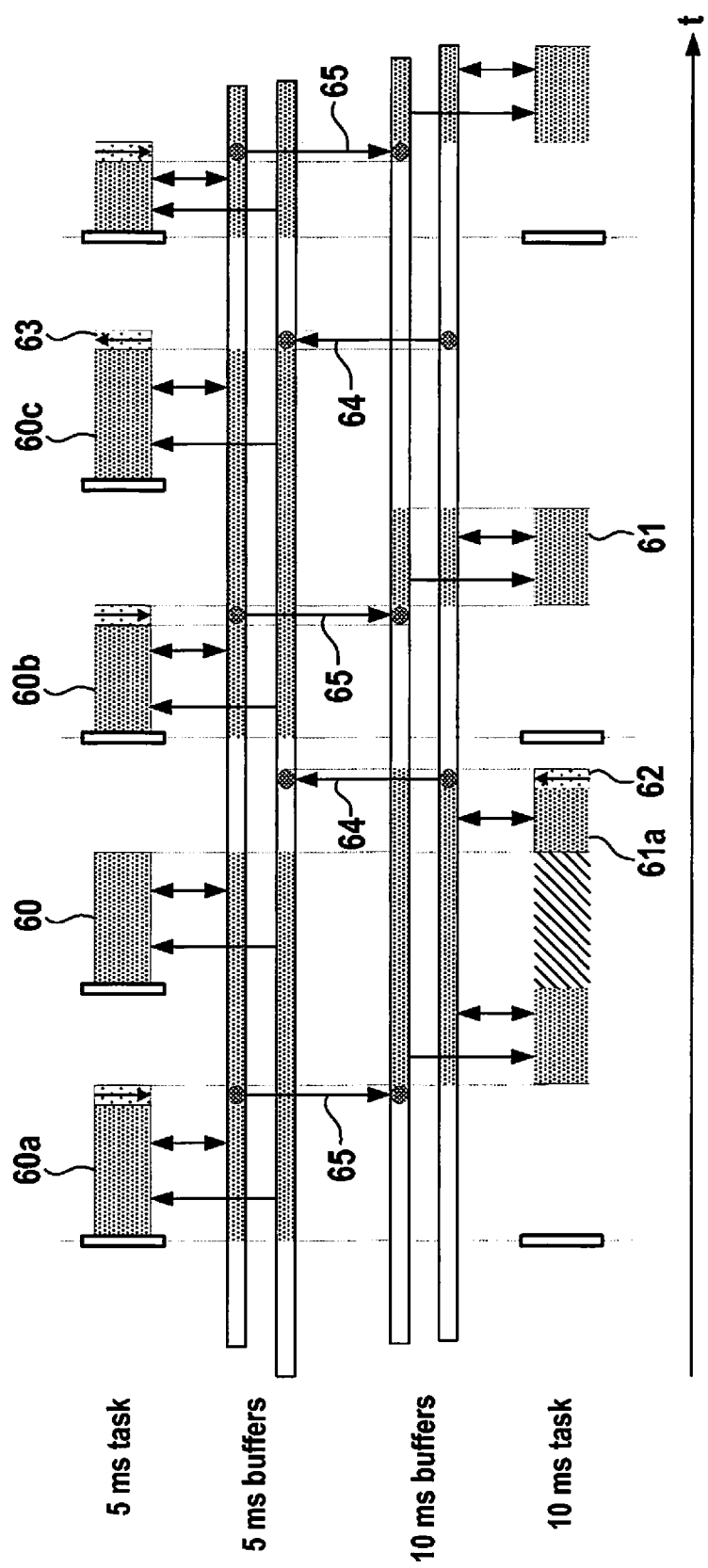
FIG. 6 schematically shows a further variant of the method for control.

FIG. 6 shows an optional variant of the method, the behavior of which differs from the above-described "logical execution time" schema as follows.

The goal in this case is to reduce the signal runtimes (latencies) within a signal effect chain, a deterministic behavior still being maintained.

As shown in FIG. 3, a 5 ms task 60 communicates here with a 10 ms task 61. Communication 64 from slower task 61 to faster task 60 still takes place at the end of the shared interval and is executed by last ended task 61a or 60c, respectively, by calling up communication functions 62 or 63.

Communication 65 from faster 5 ms test 60 to 10 ms test 61 no longer takes place at the end of the shared interval, however, but rather directly after the first execution of faster 5 ms task 60a or 60b in the shared interval.

The condition for this type of communication is that slower receiving task 61a or 61 is only executed when the communication has been completed, i.e., after ending task 60a or 60b. This is automatically the case with priority-controlled rate monotonic scheduling if both tasks are executed on the same execution unit, i.e., the same processor core, because in this case the faster tasks have a higher execution priority than the slower tasks.

If the tasks are processed on different execution units, slower task 61a or 61 may be activated at the end of transmission task 60a or 60b.

By way of this variant of the invention, for signal effect chains which extend on the path, for example, from a sensor, for example, sensor 34 in FIG. 2, to an actuator, for example, actuator 35 in FIG. 2, through a fast and then a slower task, the throughput time (latency) is reduced, which may be advantageous, for example, for control applications.

In this variant, the tasks are distributed to the execution units in consideration of dependencies between the execution periods of time within the intervals.

Figure 7:
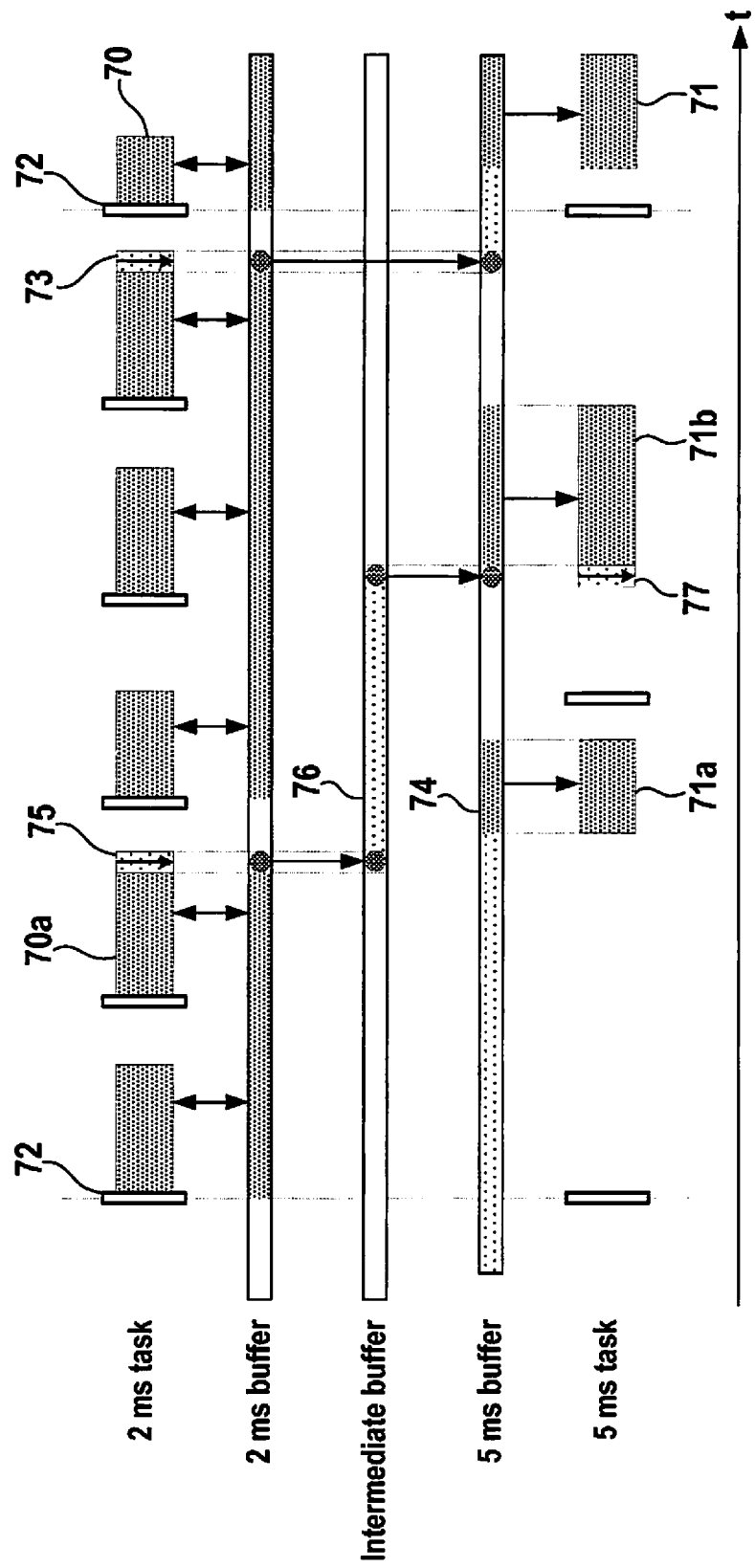
FIG. 7 schematically shows a non-harmonic communication between two tasks.

FIG. 7 shows the communication from a 2 ms test 70 to a 5 ms task 71. The length of 5 ms task 71 is not an integer multiple of the length of the 2 ms task. Communication between such tasks is referred to hereafter as non-harmonic communication.

The above-described methods proceed from regularly occurring shared interval boundaries, at which logic communication takes place. In the case of non-harmonic communication, for example, a 2 ms and a 5 ms task, this is the case only every 10 ms. Communication 73 is carried out at these shared interval boundaries 72 using one of the above-described methods at the end of the shared interval by the last ended task.

The computation results of the second 2 ms task in the shared interval are also to be communicated deterministically to the 5 ms task, but in this case there is no shared interval boundary. The values may not be copied directly into input memory 74 of the 5 ms task, because it is still blocked by first 5 ms task 71a for reading accesses.

Second 2 ms task 70a therefore initially writes the values to be communicated into a buffer memory 76 at the task end by calling up a communication function 75. Second 5 ms task 71b copies the values from buffer memory 76 into its input memory 74 at the task beginning by calling up a communication function 77.

The communication in the other direction, from the 5 ms task to the 2 ms task, functions equivalently. The first 5 ms task copies the values into another buffer memory. The fourth 2 ms task, i.e., the first 2 ms task which is activated after secure completion of the first 5 ms task in the interval from 6 ms-8 ms, copies the data from the buffer memory into its input memory.

The communication at the shared interval end proceeds, like the communication in the other direction, according to one of the above-described methods.

The task programs are preferably cyclically repeated. The intervals correspond to cycle times. The communication preferably also takes place cyclically.

In the above-described method, the communication partners may be executed on the same or on different processor cores.

The setting of status bits 20 and 21 preferably takes place if input data 17 and 15 are no longer accessed and changes are no longer performed to output data 11 and 16 within an execution of the task, i.e., at a point in time even before completing the task. The range at the cycle end is thus established by corresponding software unit 31, for example.

The advantages of the principle according to the present invention are summarized hereafter:

1. The method from DE 102 29 520 A1 is expanded in such a way that it is also usable for processing units having multiple processor cores, for example, multicore processors, while maintaining the deterministic and reproducible behavior. The concept of "logical execution time" is suitable for this purpose.

2. The method ensures the coherency of all data transferred between two tasks, i.e., all data available at the beginning of the receiver task are to originate from the same execution of the transmitter task, and the input data are not to change while the receiver task accesses them.

3. The method assists software units (tasks) controlled by an operating system, the activation rates of which are in a fixed integer ratio to one another (see FIG. 1). Multiple tasks having an identical activation rate may also be provided.

4. The method stresses the communication channels (for example, buses), less than the communication precisely at the interval boundaries as shown in FIG. 1.

5. To be able to better utilize the available computing power, the method is largely "wait-free," which means that the execution of the communication partners is not blocked for a noteworthy time, for example, to ensure the coherency of jointly used memory areas.

6. The method is implementable without expansion of the operating systems (for example, AUTOSAR-OS) typically used presently in the automotive domain.

7. The method is optimized in such a way that additional "notification" tasks may be saved, in order to reduce required processor resources (memory, runtime).

8. The method is optimized in such a way that resources (memory, runtime) may be saved under certain conditions by joint utilization of received data by multiple receivers.

9. The communication may be carried out bidirectionally, i.e., in the periods of time when a communication may be carried out between two tasks, this may take place in both directions, if there is a demand for this. Execution infrastructure (functions, counters, status memories) is thus only required once per task pair, but not per communication direction.

10. The method is optionally optimized in such a way that, under consideration of the software architecture and software distribution, load peaks are avoided and resources (memory, runtime) are used optimally.

11. The method optionally offers the possibility of reducing the latencies of a signal effect chain extending over multiple tasks.

12. The method is optionally expandable for the deterministic communication between tasks having non-harmonic intervals, for example, for the communication between a 2 ms task and a 5 ms task.

The invention claimed is:

1. A method for operating a control unit for a motor vehicle, the method comprising:
executing at least intermittently, via at least one execution unit of the control unit, the at least one execution unit being configured for executing task programs, a first task program and a second task program, the first task program and the second task program each being activated cyclically for a respective plurality of cycles, the first task program and the second task program having different cycle times relative to one another, the first task program having a cycle time for each cycle of the first task that is a length of a first predefined time interval, the first task program making data available for the second task program at the end of each cycle of the first task, and wherein the second task program has a cycle time for each cycle of the second task that is a length of a second predefined time interval, the second predefined time interval being longer than the first predefined time interval, wherein the length of the second predefined time interval is an integer multiple of the length of the first time interval and multiple cycles of the first task program occur during each cycle of the second task program;
wherein, for each cycle of the second task program, a transfer of the data from the first task program to the second task program occurs only after a last execution of the first task program within the predefined second time interval for the cycle of the second task program so that the transfer of the data from the first task program to the second task program occurs only once during each cycle of the second task program, the first task program running on a first execution unit of the control unit and the second task program running on a second execution unit, different from the first execution unit, in the control unit.

2. The method of claim 1, wherein the data from a memory area associated with the first task program are transferred directly into a memory area associated with the second task program.

3. The method of claim 1, wherein a third task program is executed to transfer the data from a memory area associated with the first task program into a buffer memory and from the buffer memory into a memory area associated with the second task program.

4. The method of claim 1, wherein the data is transferred from a memory area associated with the first task program into a memory area associated with the second task program within that cycle of the first task program which lies with respect to time in the range of a cycle end of the second task program.

5. The method of claim 1, wherein, in a first operating state of the first task program, within a time interval associated with the first task program, a memory area, which is associated with the first task program, is not accessed by another task program, and wherein in a second operating state of the first task program, within the time interval, the memory area of the first task program is not accessed by the first task program.

6. The method of claim 1, wherein a first memory area for input data is associated with a task program, a second memory area for output data is associated with the task program, and a piece of status information is provided, which indicates that the input data will no longer be accessed within an execution of the task program before the end of the present time interval and no further modifications on the output data will be carried out.

7. A control unit for operating a control unit for a motor vehicle, comprising:
a controller configured to perform the following:
executing at least intermittently, via at least one execution unit of the control unit, the at least one execution unit being configured for executing task programs, a first task program and a second task program, the first task program and the second task program each being activated cyclically for a respective plurality of cycles, the first task program and the second task program having different cycle times relative to one another, the first task program having a cycle time for each cycle of the first task that is a length of a first predefined time interval, the first task program making data available for the second task program at the end of each cycle of the first task, and wherein the second task program has a cycle time for each cycle of the second task that is a length of a second predefined time interval, the second predefined time interval being longer than the first predefined time interval, wherein the length of the second predefined time interval is an integer multiple of the length of the first time interval and multiple cycles of the first task program occur during each cycle of the second task program;
wherein, for each cycle of the second task program, a transfer of the data from the first task program to the second task program occurs only after a last execution of the first task program within the predefined second time interval for the cycle of the second task program so that the transfer of the data from the first task program to the second task program occurs only once during each cycle of the second task program, the first task program running on a first execution unit of the control unit and the second task program running on a second execution unit, different from the first execution unit, in the control unit.

* * * * *